Sept. 11, 1951     F. H. SLAYMAKER     2,567,407
ELECTROACOUSTIC TRANSDUCER

Filed April 23, 1948     2 Sheets-Sheet 1

INVENTOR.
FRANK H. SLAYMAKER
BY Albert R. Hodges
ATTORNEY

Sept. 11, 1951  F. H. SLAYMAKER  2,567,407
ELECTROACOUSTIC TRANSDUCER

Filed April 23, 1948  2 Sheets-Sheet 2

INVENTOR.
FRANK H. SLAYMAKER
BY Albert R. Hodges
ATTORNEY

Patented Sept. 11, 1951

2,567,407

UNITED STATES PATENT OFFICE 2,567,407

ELECTROACOUSTIC TRANSDUCER

Frank H. Slaymaker, Rochester, N. Y., assignor to Stromberg-Carlson Company, a corporation of New York Application April 23, 1948, Serial No. 22,755

1 Claim. (Cl. 177—352)

This invention relates to electroacoustic transducers, and more particularly to such transducers for use at ultrasonic frequencies. While not limited to this use, transducers in accordance with the present invention are specifically adapted for use in guidance devices for the blind.

One problem in the design of an electroacoustic transducer is to obtain a good impedance match, and hence an efficient coupling, between the vibrating element of the transducer and the air or other adjacent medium. One cause of this difficulty is the great difference between the acoustic resistance of air and of the vibrating element. It has been found by further analysis of this problem that the energy transfer between the vibrating element and the air may be greatly improved if means are provided for substantially eliminating the effect of the reflection of the ultrasonic energy from the surface of the vibrating element.

A possible solution of the problem would be to provide a layer of material on the vibrating element which would have a specific acoustic resistance equal to the geometric mean between the resistance of the air and that of the vibrating element. While such a solution of the problem is theoretically sound, the practical difficulty of using this approach lies in the fact that no solid material having the proper specific acoustic resistance is known at the present time.

It is an object of the present invention, therefore, to provide an improved electroacoustic transducer capable of providing a substantially better impedance match between its vibrating element and the adjacent medium.

Another object of the present invention is to provide an electroacoustic transducer incorporating means for greatly minimizing the undesired effect upon the impedance match between the vibrating element of the transducer and the adjacent medium which is due to the reflection of energy from the surface of the vibrating element.

A further object of the present invention is to provide a method for improving the impedance match, and hence the transfer of energy, between the vibrating element of an electroacoustic transducer and the adjacent medium.

The above and other objects are realized, in accordance with the present invention, by combining with an electroacoustic transducer having a vibrating element, means for improving the impedance match between the vibrating element and the adjacent medium. This means comprises a partially reflective element which is disposed in spaced relationship to the vibrating element. More specifically, a preferred embodiment of the present invention, comprising an electroacoustic transducer having a vibrating element comprising a diaphragm, may employ a disklike reflecting element disposed in substantially parallel spaced relationship to the diaphragm. This reflecting element preferably comprises a perforated sheet, usually but not necessarily of a metallic material. In order to secure desired directivity of radiation with some types of vibrating elements, the electroacoustic transducer may have a converging horn with the vibrating element disposed at the restricted end thereof. In this arrangement, the reflecting element will also be disposed near the restricted end of the horn.

The above and other objects and features of the present invention will be better understood by reference to the following description taken in connection with the accompanying drawings, in which.

Figure 1:
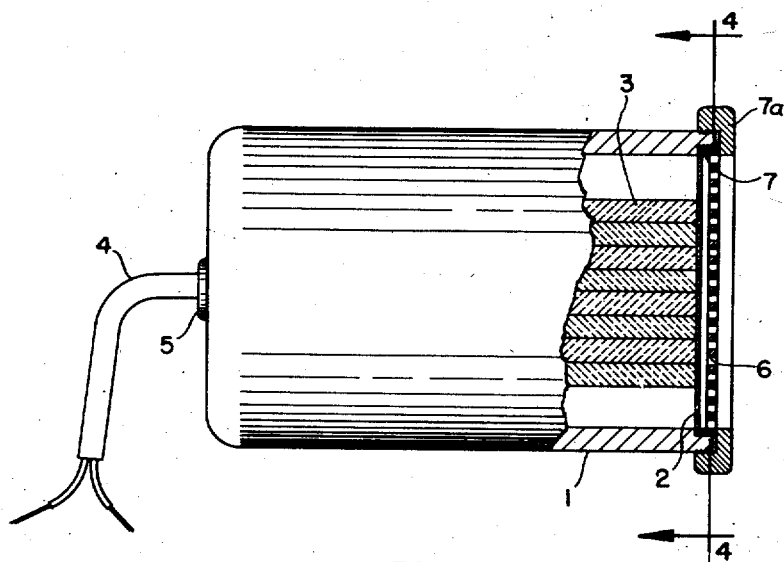
Fig. 1 is an elevation, partly in section, of an electroacoustic transducer in accordance with the present invention.
Figure 4:
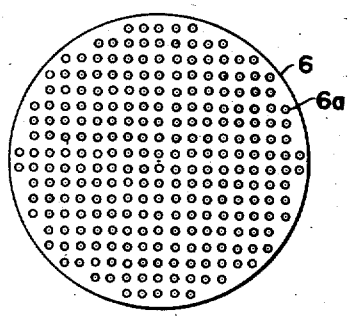

Fig. 4 is a view of the face of reflecting element 6 taken in the direction of the arrows 4—4 of Fig. 1 and substantially represents the face of reflecting element 15.

Referring to Fig. 1 of the drawings, there is shown an electroacoustic transducer comprising a housing 1 and a vibrating element or diaphragm 2. Attached to vibrating element 2 is a crystal mosaic 3, comprising a plurality of layers of piezoelectric material. The electric connections to mosaic 3 are brought out in a cable 4 through a suitable grommetted opening 5 in housing 1.

Disposed in front of vibrating element 2 and substantially parallel thereto is a reflecting element 6, preferably comprising a perforated sheet of metallic material having perforations 6a distributed over the surface of reflective element or member 6. Vibrating element 2 and reflecting element 6 are rigidly supported at the edges in any suitable manner, as for example by means of a spacer ring 7 and a clamping ring 7a, the latter being arranged to threadably engage housing 1.

Reflecting element 6 is of sufficiently rigid material that substantially all transmission is through the perforations or apertures and substantially none through the material of the reflector. The spacing between vibrating element 2 and reflecting element 6 is preferably of the order of half a wavelength of the ultrasonic energy to be transferred although the spacing may be of the order of any odd number of half wavelengths so long as that spacing is such that the portion of the ultrasonic energy reflected by the vibrating element 2 is substantially 180° out of phase with the portion of the energy reflected by the reflective element 6. The perforations are of such size and quantity that the amplitude of the above-mentioned reflected portions of energy are of substantially equal amplitude.

Figure 2:
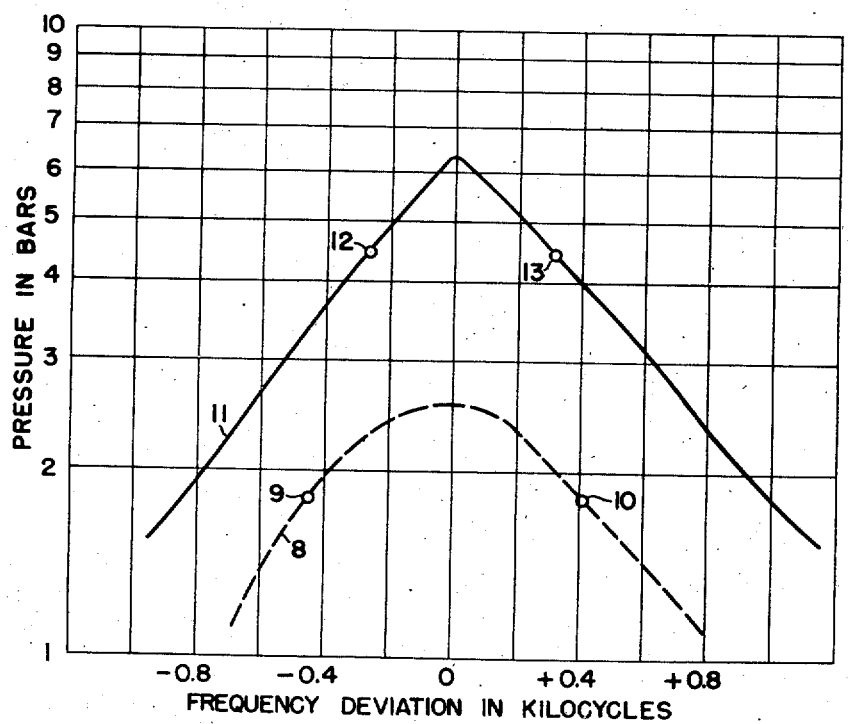
Fig. 2 is a graph showing the performance of an electroacoustic transducer according to Fig. 1.

The effect of employing reflecting element 6 will be better understood by referring to Fig. 2, in which the frequency deviation in kilocycles is plotted to a linear scale on the abscissa axis and the sound pressure in bars is plotted to a logarithmic scale on the ordinate axis. Curve 8 represents the performance obtained with an electroacoustic transducer of the type shown in Fig. 1, except that the reflecting element 6 was omitted. The circles 9 and 10 represent the half-power points of curve 8, and it will be observed that the bandwidth at this level is approximately 0.85 kilocycle. The maximum sound pressure at the center frequency is approximately 2.6 bars.

Curve 11 of Fig. 2 shows the effect of adding reflecting element 6 to the transducer of Fig. 1. It will be observed that the sound pressure is increased to approximately 6.3 bars, representing a gain of approximately 7.6 decibels compared with the maximum pressure realized in the same transducer without the reflecting element. The bandwidth between the half-power points represented by circles 12 and 13 on curve 11 is approximately 0.6 kilocycle, a decrease of less than 30 per cent compared with that realized without the reflecting element.

In the particular device which was measured at a center frequency of 76.2 kilocycles per second to form the basis for Fig. 2, reflecting element 6 comprised a brass sheet 0.015 inch thick, punched with 0.023-inch holes on 0.04-inch centers, the combined area total of the perforations thereby being of the order of one-third of the imperforate area of the reflective element. It will be understood that the reflecting element may comprise silk cloth, wire screening, or aluminum foil, or other suitable material, without departing from the scope of the present invention.

The improved performance achieved in accordance with the present invention is readily apparent when it is pointed out that increasing the efficiency of the transducer at the center frequency by decreasing its resistance in order to improve its resonant gain or Q would cause a directly proportional decrease in the bandwidth. Thus the bandwidth would be reduced to approximately 0.35 kilocycle, which is less than 60 per cent of that realized in accordance with the present invention. In the device of the general type contemplated, a relatively large bandwidth is a distinct advantage, since it is frequently desired to handle ultrasonic energy in the form of pulses. Such pulse energy cannot efficiently be transferred by narrow-bandwidth devices.

Figure 3:
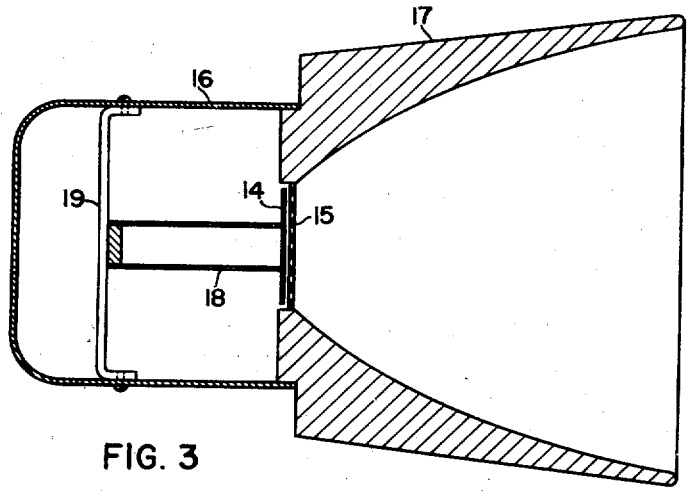
Fig. 3 is an elevation, partly in section, of a transducer in accordance with the present invention, employing a modified form of vibrating element and a converging horn.

Referring now to Fig. 3, there is shown an electroacoustic transducer having a vibrating element 14, a reflecting element 15, a housing 16, and a reflecting horn 17. In this embodiment, vibrating element 14 is a free-edge disk which is driven in any suitable manner, as for example by a magneto-strictive element 18, one end of which is attached to vibrating element 14 and the other end of which is anchored, as shown, by being secured to a member 19, which in turn is supported by housing 16. A suitable radiator unit of this general type is disclosed and claimed in United States Letters Patent 2,541,944, Slaymaker et al., issued February 13, 1951, and assigned to the same assignee as the present invention. Reflecting horn 17 is employed to secure a desired directivity of radiation with this type of radiating unit.

While there has been described what is at present considered the preferred embodiment of the invention, it will be obvious to those skilled in the art that various changes and modifications may be made therein without departing from the invention, and it is, therefore, aimed in the appended claim to cover all such changes and modifications as fall within the true spirit and scope of the invention.

What is claimed is:

In combination with an electroacoustic transducer for ultrasonic energy of a given wavelength, said transducer having a vibrating element, means for substantially canceling reflections from said element and thereby improving the impedance match between said vibrating element and the adjacent medium, said means comprising a perforated partially reflective element substantially parallel to and equal in area to said vibrating element and of such rigidity that substantially all of the transmission of said energy is through said perforations and substantially no energy is transmitted through the material of said reflective element, said reflective element being disposed with a spacing from said vibrating element of the order of an odd number of half wavelengths of said given wavelength in the medium through which such energy is conveyed such that the portion of said energy reflected by said vibrating element is substantially 180° out of phase with that portion of said energy reflected by said reflective element, said perforations being distributed over the entire area of the reflective element and having a combined area total of the order of one-third of the imperforate area of said reflective element such that the amplitudes of said reflected portions of energy are substantially equal.

FRANK H. SLAYMAKER.

REFERENCES CITED

The following references are of record in the file of this patent:

UNITED STATES PATENTS

| Number | Name | Date |
| --- | --- | --- |
| 1,534,373 | Fischer | Apr. 21, 1925 |
| 1,761,745 | Pomeroy | June 3, 1930 |
| 2,263,308 | Mason (A) | Nov. 18, 1941 |
| 2,323,030 | Gruetzmacher | June 29, 1943 |
| 2,384,465 | Harrison | Sept. 11, 1945 |
| 2,417,830 | Keller | Mar. 25, 1947 |
| 2,427,348 | Bond et al. | Sept. 16, 1947 |
| 2,430,013 | Hansell | Nov. 4, 1947 |
| 2,438,936 | Mason (B) | Apr. 6, 1948 |
| 2,443,177 | Beechylyn | June 15, 1948 |
| 2,447,333 | Hayes | Aug. 17, 1948 |

OTHER REFERENCES

Elements of Accoust. Eng'g, Olson, p. 301, pub. 1947 by D. Van Nostand N. Y. C.